United States Patent
Ophardt et al.

(10) Patent No.: US 6,409,050 B1
(45) Date of Patent: Jun. 25, 2002

(54) LIQUID DISPENSER FOR DISPENSING FOAM

(75) Inventors: Heiner Ophardt, Vineland (CA); Ali Mirbach, Issum, DE (US)

(73) Assignee: Hygiene-Technik Inc., Beamsville (CA)

( * ) Notice: Subject to any disclaimer, the term of this patent is extended or adjusted under 35 U.S.C. 154(b) by 0 days.

(21) Appl. No.: 09/965,821

(22) Filed: Oct. 1, 2001

(30) Foreign Application Priority Data

Mar. 20, 2001 (CA) .............................................. 2341659

(51) Int. Cl.[7] .................................................. B67D 5/06
(52) U.S. Cl. .................................................... 222/181.1
(58) Field of Search ........................ 222/1, 181.1, 321, 222/325, 326, 340, 378

(56) References Cited

U.S. PATENT DOCUMENTS

| | | | |
|---|---|---|---|
| 4,993,600 A | * 2/1991 | Tucker et al. | ................ 222/321 |
| 5,165,577 A | 11/1992 | Ophardt | |
| 5,271,530 A | 12/1993 | Uehira | |
| 5,282,552 A | 2/1994 | Ophardt | |
| 5,373,970 A | 12/1994 | Ophardt | |
| 5,431,309 A | * 7/1995 | Ophardt | .................... 222/181.3 |
| 5,445,288 A | 8/1995 | Banks | |
| 5,489,044 A | * 2/1996 | Ophardt | ......................... 222/1 |
| 5,676,277 A | 10/1997 | Ophardt | |
| 5,975,360 A | 11/1999 | Ophardt | |
| 6,082,586 A | 7/2000 | Banks | |

* cited by examiner

Primary Examiner—William C. Doerrler
Assistant Examiner—Thach H. Bui
(74) Attorney, Agent, or Firm—Riches, McKenzie & Herbert LLP

(57) ABSTRACT

A pump assembly provides for direct replacement of volumes of liquid from a reservoir with equal volumes of air preferably at substantially atmospheric pressure, the same pressure or with pressure equalization to be at least equal to atmospheric pressure. A slide arrangement preferably positively displaces liquid from the reservoir and air into the reservoir. The pump draws air from the atmosphere into a chamber from which the air either is available for passage to replace liquid from the reservoir or is pressurized to assist dispensing liquid, preferably, admixing with the liquid to provide foaming. Gravity separation of air and liquid to be dispensed is used to replace liquid with air in the reservoir and to selectively place air and liquid into communication with passageways for ejection.

17 Claims, 11 Drawing Sheets

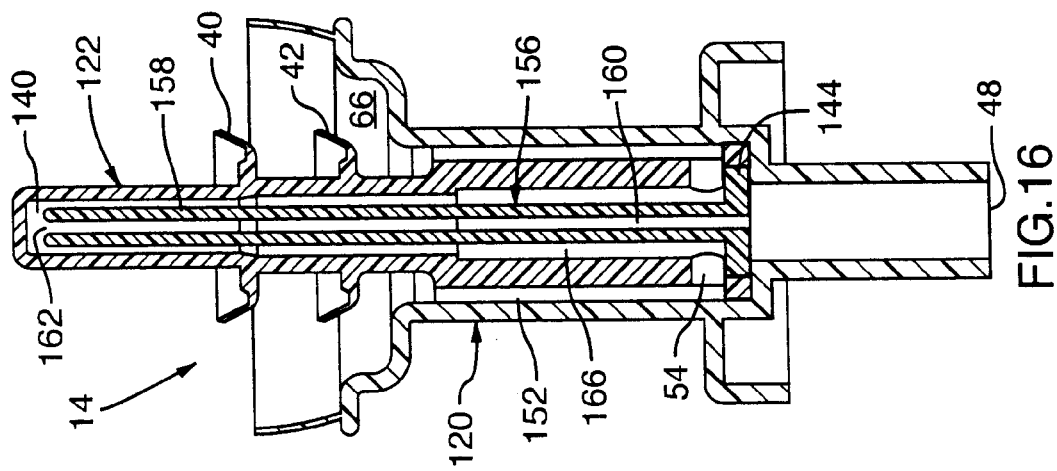
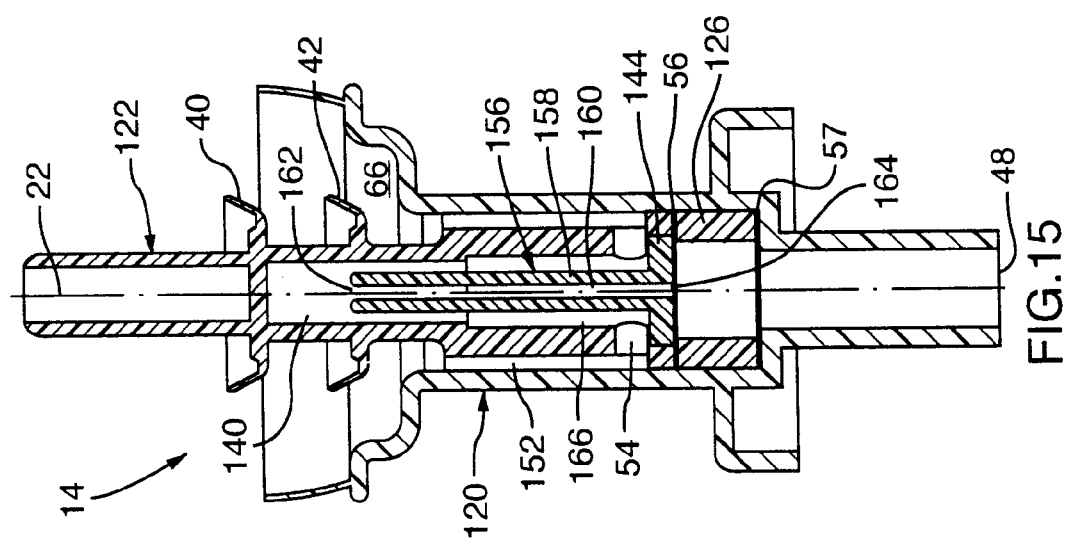

LIQUID DISPENSER FOR DISPENSING FOAM

SCOPE OF THE INVENTION

This invention relates to liquid dispensers and, more particularly, liquid dispensers to dispensing liquid as a foam.

BACKGROUND OF THE INVENTION

Liquid dispensers for dispensing soaps and other similar fluids in liquid form are known. For various reasons in some applications, it is preferable to dispense soaps and other similar fluids in the form of a foam. Generally, in the form of a foam, less soap liquid is required to be used as contrasted with the soap in the liquid form. As well, soap as foam is less likely to run off a user's hands or other surfaces to be cleaned.

Known liquid dispensers for dispensing foams include the dispenser taught by U.S. Pat. No. 5,445,288 to Banks, issued Jul. 29, 1995. A disadvantage which the present inventor has appreciated with dispensers such as those taught by Banks is that when used with a non-collapsible or rigid sealed container of soap liquid, a vacuum comes to be developed in the container which renders the dispenser inoperative.

Known liquid dispensers for dispensing liquids without foaming of the liquids are also known. The present inventor has also appreciated that many such dispensers also suffer the disadvantage that they are not suitable for use with non-collapsible or rigid sealed containers since the pumps develop a vacuum in the container. Non-collapsible or rigid sealed containers have the disadvantage of requiring various one-way valve mechanisms to permit air to enter the containers under vacuum to equalize the pressure in the containers with atmospheric pressure. Such one-way valves typically suffer the disadvantage that they maintain at least some vacuum pressure differential in the container and with many viscous soaps, the presence of even a slight vacuum can negatively affect dispensing.

The present inventor has also appreciated that known soap dispensers suffer the disadvantage that they do not permit for positive replacement of air for liquid dispensed from a liquid reservoir and/or do not permit a positive pressure to develop in a container.

SUMMARY OF THE INVENTION

To at least partially overcome these disadvantages of previously known devices, the present invention provides a pump for dispensing fluid which provides for a positive replacement of liquid dispensed from a container, preferably with atmospheric air. The present invention also provides a pump for dispensing liquid in the form of a foam preferably without creating a vacuum in a non-collapsible or rigid sealed container.

An object of the present invention is to provide an improved pump for dispensing a liquid.

Another object is to provide an improved pump for dispensing a liquid in the form of a foam.

Another object is to provide a pump for dispensing liquid from a non-collapsible or rigid sealed container without creating a vacuum in the container.

Another object is to provide a pump which provides for positive replacement of liquid dispensed from a container by atmospheric air.

Accordingly, in one aspect, the present invention provides a pump for dispensing liquid from a reservoir comprising:

a piston chamber-forming member having an inner cylindrical chamber and an outer cylindrical chamber each having a diameter, a chamber wall, an inner end and an outer end;

the diameter of the inner chamber being less than the diameter of the outer chamber, the inner chamber and outer chamber being coaxial with the outer end of the inner chamber opening into the outer chamber;

an inner end of the inner chamber in fluid communication with the reservoir;

a piston-forming element received in the piston chamber-forming member axially slidable inwardly and outwardly therein between an outward extended position and an inward retracted position;

the piston-forming element having an axially extending hollow stem having a central passageway closed at an inner end and having an outlet proximate an outer end;

an inner disk on the stem extending radially outwardly from the stem adapted to engage to the chamber wall of the inner chamber;

an intermediate disk on the stem extending radially outwardly from the stem adapted to engage the chamber wall of the inner chamber, the intermediate disk spaced axially outwardly from the inner disk relative the inner end of the stem;

an outer disk on the stem spaced axially outwardly from the intermediate disk and extending radially outwardly from the stem into engagement with the chamber wall of the outer chamber to prevent fluid flow outwardly therebetween;

an inlet located on the stem between the outer disk and the intermediate disk in communication with the passageway;

in the retracted position, the intermediate disk is received in the inner chamber to prevent fluid flow from the outer end of the inner chamber outwardly therepast and the inner disk does not prevent fluid flow between the reservoir and the inner chamber therepast via the inner end of the inner chamber;

in the extended position, the inner disk is received in the inner chamber to prevent fluid flow from the inner end of the inner chamber inwardly therepast and the intermediate disk does not prevent fluid flow between the inner chamber and the outer chamber via the outer end of the inner chamber.

Preferably, the pump includes a porous member in the passageway between the inlet and the outlet for generating turbulence in fluid passing therethrough to generate foam when air and liquid pass therethrough simultaneously.

In preferred embodiments, the pump assembly provides for direct replacement of volumes of liquid from a reservoir with equal volumes of air preferably at substantially atmospheric pressure, the same pressure or with pressure equalization to be at least equal to atmospheric pressure. A slide arrangement preferably positively displaces liquid from the reservoir and air into the reservoir. The pump draws air from the atmosphere into a chamber from which the air either is available for passage to replace liquid from the reservoir or is pressurized to assist dispensing liquid, preferably, admixing with the liquid to provide foaming. Gravity separation of air and liquid to be dispensed is used to replace liquid with air in the reservoir and to selectively place air and liquid into communication with passageways for ejection.

BRIEF DESCRIPTION OF THE DRAWINGS

Further aspects and advantages of the present invention will become apparent from the following description taken together with the accompanying drawings in which:

FIG. 15 is a cross-sectional side view of a piston for a pump assembly in accordance with a third embodiment of the present invention;

FIG. 16 is a cross-sectional side view of a piston for a pump assembly in accordance with a fourth embodiment of the present invention;

DETAILED DESCRIPTION OF THE DRAWINGS

Figure 2:
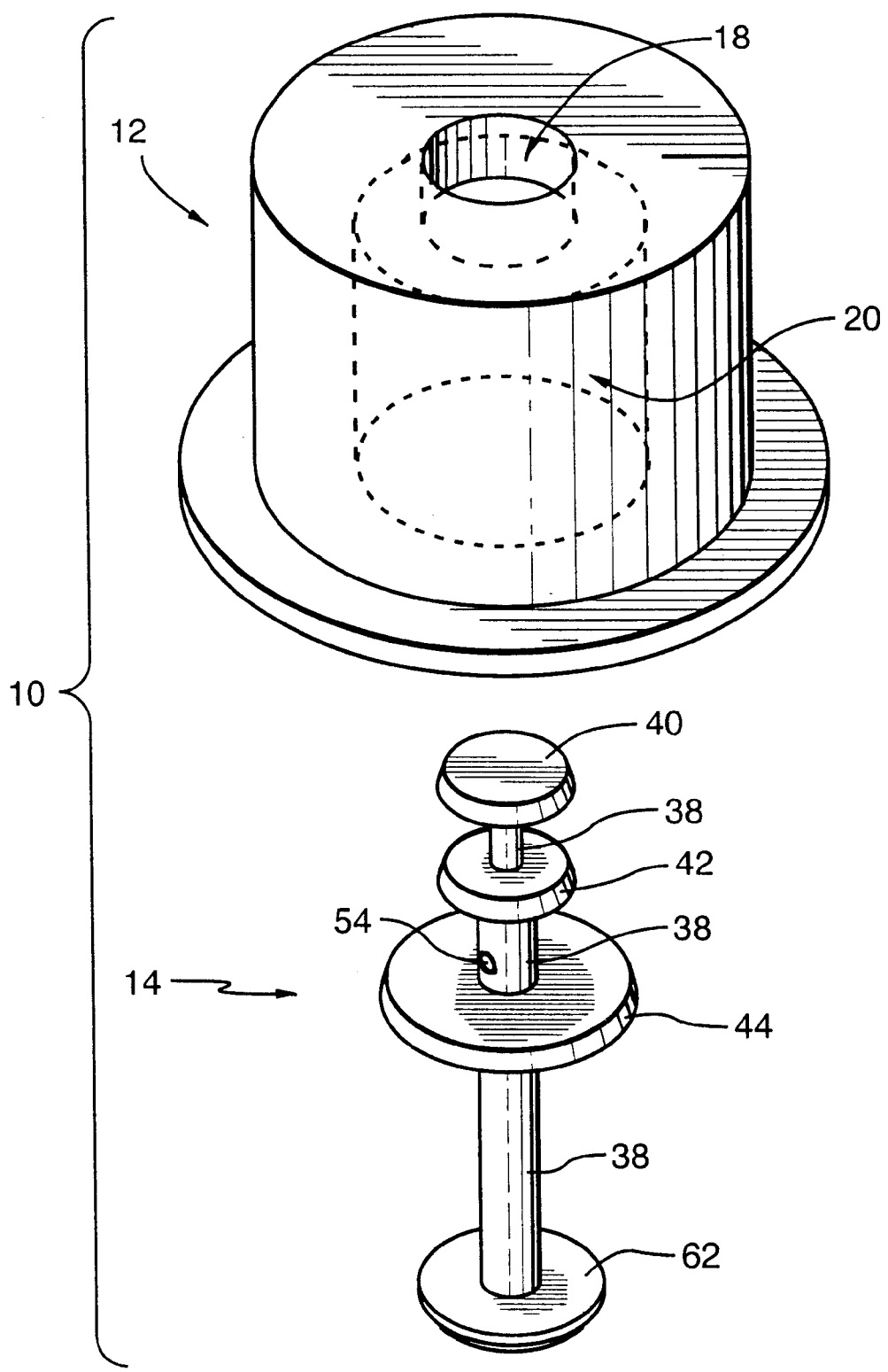
FIG. 2 is a partially exploded perspective view of the pump assembly shown in FIG. 1.
Figure 3:
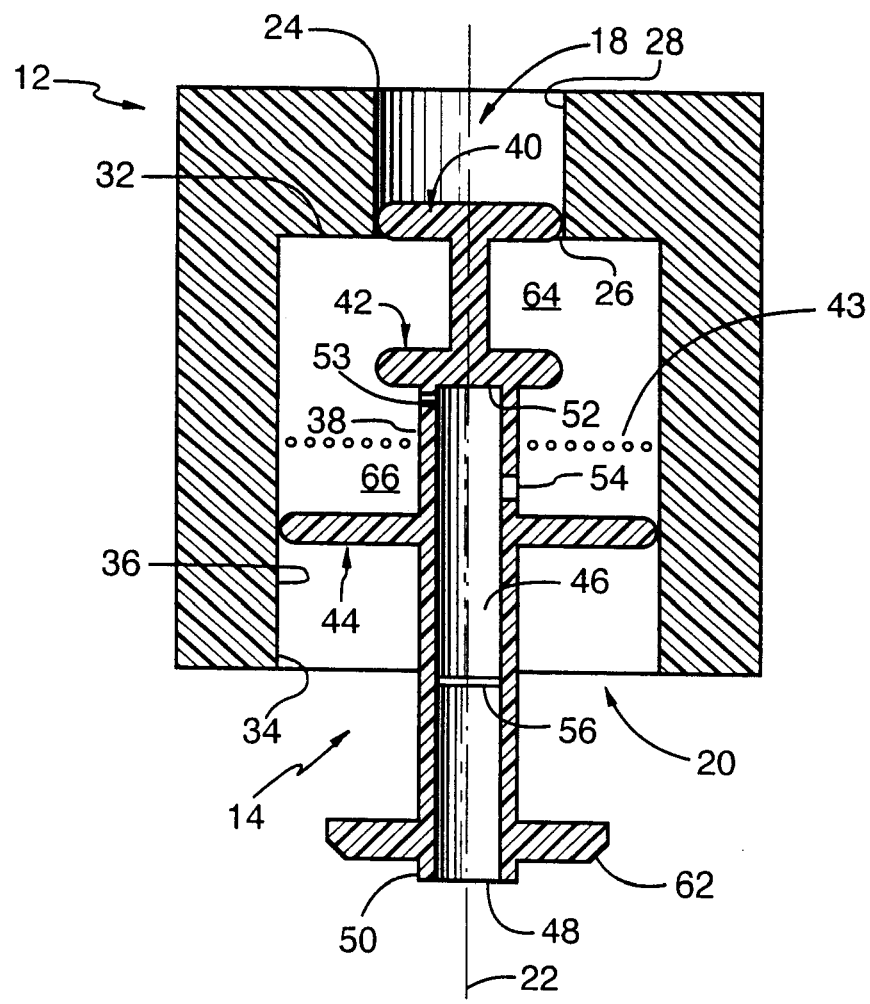
FIG. 3 is a cross-sectional side view of an assembled pump assembly of FIG. 2 showing the piston in a fully extended position.

Reference is made first to FIGS. 2 and 3 which show a pump assembly generally indicated 10. Pump assembly 10 is best shown in FIG. 2 as comprising two principal elements, a piston chamber-forming body 12 and a piston 14.

Referring to FIG. 3, body 12 has an inner cylindrical chamber 18 and an outer cylindrical chamber 20 both coaxially disposed about an axis 22. The inner chamber 18 has an inlet opening 24 and an outlet opening 26. The inner chamber has a cylindrical chamber side wall 28. The outlet opening 26 opens into an inlet end of the outer chamber 20 from an opening in a shoulder 32 forming the inner end of the outer chamber 20. The outer chamber has an outlet opening 34 and a cylindrical chamber side wall 36.

Piston 14 is axially slidably received in the body 12. The piston 14 has an elongate stem 38 upon which four disks are provided at axially spaced locations. An inner sealing disk 40 is provided at an innermost end spaced axially from an intermediate sealing disk 42 which, in turn, is spaced axially from an outer sealing disk 44. The inner sealing disk 40 and intermediate sealing disk 42 are adapted to be axially slidable within the inner chamber 18. Each of the inner sealing disk 40 and intermediate sealing disk 42 extend radially outwardly from the stem 38 so as to be adapted to sealably engage the side wall 28 of the inner chamber 18.

The outer sealing disk 44 is adapted to be axially slidable within the outer cylindrical chamber 20. The outer sealing disk 44 extends radially outwardly from the stem 38 to sealably engage the side wall 36 of the outer chamber 20.

The piston 14 essentially forms, as defined between the inner sealing disk 40 and the intermediate sealing disk 42, an annular inner compartment 64 which opens radially outwardly as an annular opening between the disks 42 and 44. Similarly, the piston 14 effectively forms between the intermediate sealing disk 42 and the outer sealing disk 44 an annular outer compartment 66 which opens radially outwardly as an annular opening between the disks 42 and 44.

An outermost portion of the stem 38 is hollow with a central passageway 46 extending from an outlet 48 at the outermost end 50 of the stem 38 centrally through the stem 38 to a closed inner end 52. Radially extending inlets 53 and 54 extend radially through the stem into the passageway 46, with the inlets 53 and 54 being provided on the stem in between the outer sealing disk 44 and the intermediate sealing disk 42. A foam inducing screen 56 is provided in the passageway 46 intermediate between the inlets 53 and 54 and the outlet 48. The screen 56 may be fabricated of plastic, wire or cloth material. It may comprise a porous ceramic measure. The screen 56 provides small apertures through which an air and liquid mixture may be passed to aid foam production as by production of turbulent flow through small pores or apertures of the screen thereof in a known manner.

The piston 14 also carries an engagement flange or disk 62 on the stem outward from the outer sealing disk 44. Engagement disk 62 is provided for engagement by an activating device in order to move the piston 14 in and out of the body 12.

Figure 1:
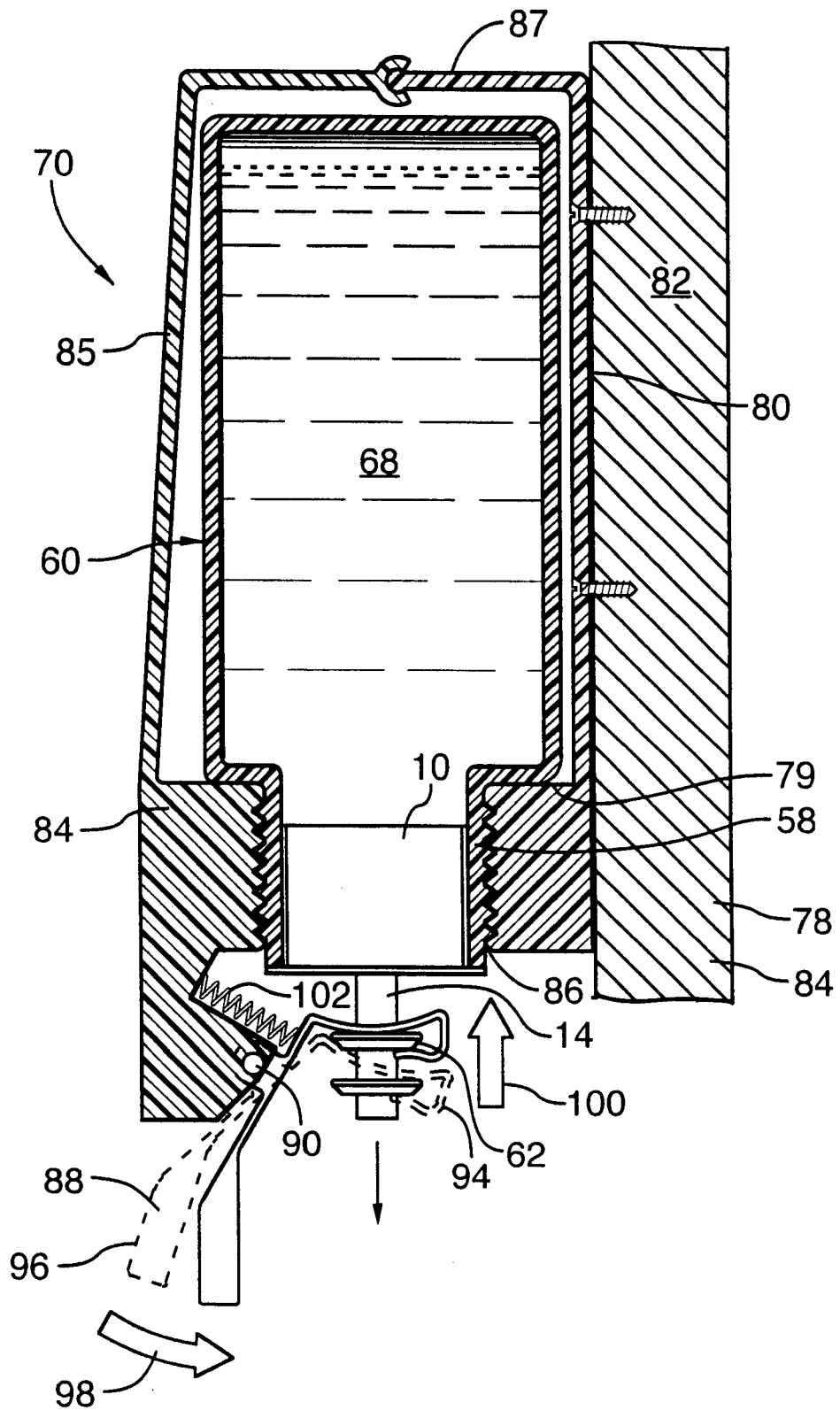
FIG. 1 is a partially cut-away side view of a first preferred embodiment of a liquid dispenser with a reservoir and pump assembly in accordance with the present invention.

Reference is now made to FIG. 1 which shows a liquid soap dispenser generally indicated 70 utilizing the pump assembly 10 of FIGS. 2 and 3 secured in the neck 58 of a sealed, non-compressible, rigid reservoir 60 containing liquid hand soap 68 to be dispensed. Dispenser 70 has a housing generally indicated 78 to receive and support the pump assembly 10 and the reservoir 60. Housing 78 is shown with a back plate 80 for mounting the housing, for example, to a building wall 82. A bottom support plate 84 extends forwardly from the back plate to support and receive the reservoir 60 and pump assembly 10. As shown, bottom support plate 84 has a circular opening 86 therethrough. The reservoir 60 sits supported on shoulder 79 of the support plate 84 with the neck 58 of the reservoir 60 extending through opening 86 and secured in the opening as by a friction fit, clamping and the like. A cover member 85 is hinged to an upper forward extension 87 of the back plate 80 so as to permit replacement of reservoir 60 and its pump assembly 10.

Support plate 84 carries at a forward portion thereof an actuating lever 88 journalled for pivoting about a horizontal axis at 90. An upper end of the lever 88 carries a hook 94 to engage engagement disk 62 and couple lever 88 to piston 14, such that movement of the lower handle end 96 of lever 88 from the dashed line position to the solid line position, in the direction indicated by arrow 98 slides piston 14 inwardly in a retraction pumping stroke as indicated by arrow 100. On release of the lower handle end 96, spring 102 biases the upper portion of lever 88 downwardly so that the lever draws piston 14 outwardly to a fully withdrawn position as seen in dashed lines in FIG. 1. Lever 88 and its inner hook 94 are adapted to permit manual coupling and uncoupling of the hook 94 as is necessary to remove and replace reservoir 60 and pump assembly 10.

In use of the dispenser 70, once exhausted, the empty reservoir 60 together with the attached pump 10 are removed and a new reservoir 60 and attached pump 10 may be inserted into the housing. Preferably, the removed reservoir 60 with its attached pump 10 are both made entirely out of recyclable plastic material which can easily be recycled without the need for disassembly prior to cutting and shredding.

FIG. 3 shows as dotted line 43 a preferred level of liquid in the outer chamber 20 ready for expulsion in a retraction stroke. Liquid level line 43 is above inlet 54 but below inlet 53 so that air above line 43 is in communications with inlet 53 and liquid is in communication with inlet 54.

Figure 4:
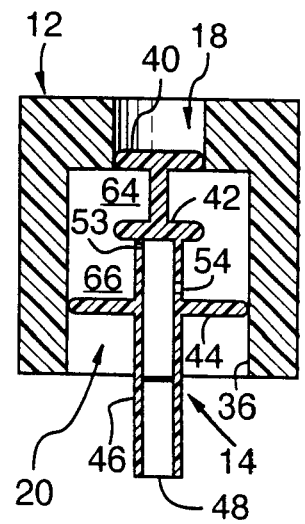
FIG. 4 is the same side view as in FIG. 3.
Figure 5:
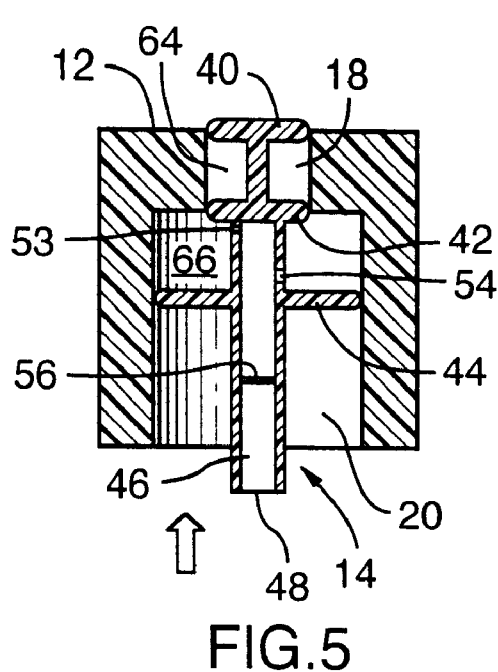
FIG. 5 is a cross-sectional side view similar to FIG. 3 but with the piston in an intermediate position in a retraction stroke.
Figure 6:
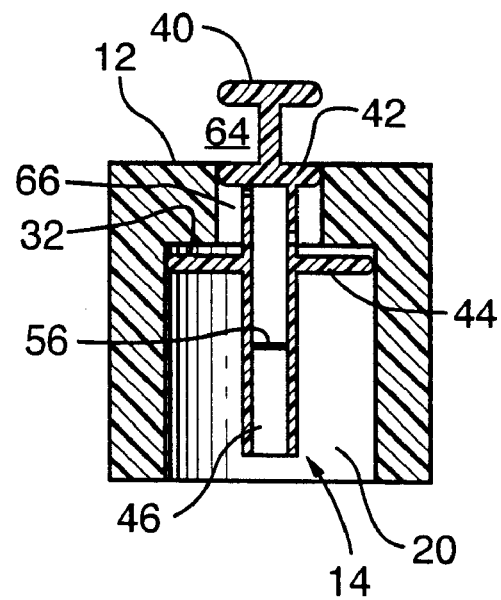
FIG. 6 is a cross-sectional side view similar to FIG. 3 but with the piston in a fully retracted position.

Reference is now made to FIGS. 4 to 8 which show a cycle of operation in which the piston 14 is moved in a retraction stroke from the extended position of FIG. 4 to the intermediate position of FIG. 5 and then to the fully retracted position of FIG. 6. Subsequently, piston 14 is moved in an extension stroke from the fully retracted position of FIG. 6, to the intermediate position of FIG. 7 and, subsequently, to the fully extended position of FIG. 8. It is to be appreciated that FIGS. 5 and 7 both show the piston 14 in the intermediate position and FIGS. 4 and 8 both show the piston in the fully extended position. For convenience in each of FIGS. 4 to 8, the engagement disk 62 is not shown.

In the fully extended position as seen in FIG. 4, the inner sealing disk 40 closes the inner chamber 18 preventing flow inward and outward through the inner chamber 18. The intermediate sealing disk 42 is disposed in the outer chamber 20. With the intermediate sealing disk 42 in the larger diameter outer chamber 20, the inner compartment 64 and outer compartment 66 are in communication with each other.

As seen in FIG. 4 and in every position which the piston 14 can assume in each of FIGS. 4 to 8, the outer sealing disk 44 engages the side wall 36 of the outer chamber 20 and prevents liquid flow inwardly or outwardly therepast. As well, at all times, the outlet 48 of the central passageway 46 is in communication with the outer compartment 66 via the passageway 46 and inlets 53 and 54.

In the fully extended position shown in FIG. 4 with the inner chamber 18 vertically above the outer chamber 20, to the extent there is any liquid in the inner compartment 64, that liquid will, under gravity, flow from inner compartment 64 downwardly into outer compartment 66 to be replaced by air in the outer compartment 66 rising upwardly into the inner compartment 64.

In moving from the fully extended position of FIG. 4 to the intermediate position of FIG. 5, since the outer chamber 20 has a larger diameter than the inner chamber 18, air and liquid in both the inner compartment 64 and outer compartment 66 are compressed and forced to exit the outer compartment 66 via inlets 53 and 54 into the central passageway 46, down the central passageway 46 through the wire screen 56 and, hence, down the central passageway 46 to exit the outlet 48. The nature of the inlets 53 and 54 are to be chosen to enhance appropriate mixing of air and liquid in the passageway 46 prior to engaging the screen 56. For example, as shown, inlet 54 is larger than inlet 53. Larger inlet 54 is provided closer to the outer sealing disk 44. Smaller inlet 53 is provided at a height above the larger inlet 54 closer to the intermediate sealing disk 42. Since liquid will flow under gravity to lie on outer disc 44, larger inlet 54 is more likely to have liquid forced therethrough, whereas smaller inlet 53 is more likely to have air forced therethrough than larger inlet 54.

FIG. 5 shows an intermediate position in the retraction stroke being illustrated as a point when each of the inner sealing disk 40 and the intermediate sealing disk 42 seal the inner chamber 18 with both preventing fluid flow therethrough. In the preferred illustrated embodiment, substantially simultaneously with the intermediate sealing disk 42 commencing to close the inner chamber 18, the inner sealing disk 40 becomes moved inwardly from the inner chamber 18 to open the inner compartment 64 to the reservoir 60.

In moving from the position of FIG. 4 to the position of FIG. 5, air within the inner compartment 64 moves upwardly into the inner chamber 18. In moving from the position of FIG. 4 to the position of FIG. 5, it is to be appreciated that the inner chamber 18 is continuously sealed against flow therethrough by the inner sealing disk 40. In moving from the intermediate position of FIG. 5 to the fully retracted position of FIG. 6, it is to be appreciated that the intermediate sealing disk 42 continuously forms a seal with the inner chamber 18 preventing fluid flow therethrough. Once the intermediate sealing disk 42 engages in the inner chamber 18 as seen in FIG. 5, then the inner compartment 64 is no longer in communication with the outer compartment 66. As well, once the inner sealing disk 40 is located inwardly from the inner chamber 18 so that it no longer seals the inner chamber 18, then the inner compartment 64 is in communication with the interior of the reservoir 60.

Air which is within the inner compartment 64 in the intermediate position shown in FIG. 5, on inward movement of the piston 14 in the retraction stroke toward the position of FIG. 6, comes to be in communication with the interior of the reservoir 60 and such air will, under gravity, float upwardly in the fluid 68 in the reservoir 60 and be displaced by liquid 68 from the reservoir 60 which will flow into the inner compartment 64. Thus, once the piston 14 moves inwardly from the intermediate position shown in FIG. 5 with the inner sealing disk 40 no longer closing the inlet opening 26 of the inner chamber 18, then air in the inner compartment 64 rises upwardly into the reservoir and fluid 68 from the reservoir 60 fills the inner compartment 64.

On the piston reaching the intermediate position shown in FIG. 5, the intermediate sealing disk 42 forms a seal with the inner chamber 18 and the outer compartment 66 is thereby isolated from the inner compartment 64. Air and liquid in the inner compartment 66 is, on continued movement of the piston 14 from the position of FIG. 5 to the fully retracted position of FIG. 6, continued to be compressed with air and liquid to be displaced out the inlets 53 and 54.

As seen in FIG. 6 in the fully retracted position, the outer sealing disk 44 may engage the shoulder 32 forming the inlet end of the outer chamber 20.

Figure 8:
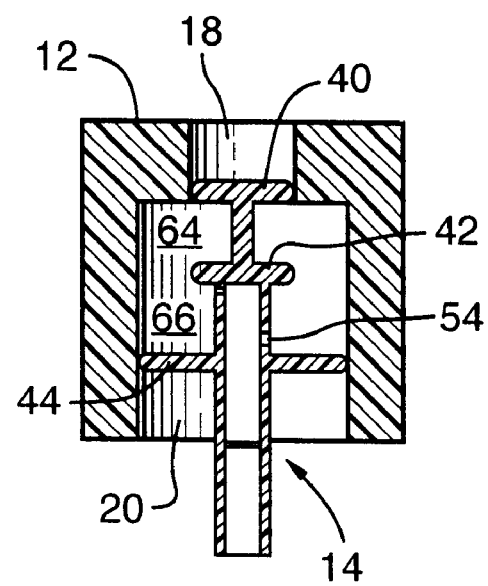
FIG. 8 is a cross-sectional side view substantially identical to that shown in FIG. 3, however, at the end of an extension stroke.

An extension cycle is now discussed referring to the movement of the piston from the position of FIG. 6 to the position of FIG. 8.

In the position of FIG. 6, only a small residual amount of liquid will remain within the outer compartment 66. On moving of the piston 14 from the position of FIG. 6 to the position of FIG. 7, liquid which fills the inner compartment 64 is moved downwardly into the inner chamber 18 and becomes captured between the inner sealing disk 40 and intermediate sealing disk 42 within the inner chamber 18 once the inner sealing disc 40 enters the inner chamber 18. Meanwhile, since the diameter of the inner chamber 18 is less than the diameter of the outer chamber 20, a partial vacuum is created within the outer compartment 66 which draws air inwardly via the outlet 48, through the screen 56 and passageway 46 and the inlets 53 and 54 into the outer compartment 66.

Figure 7:
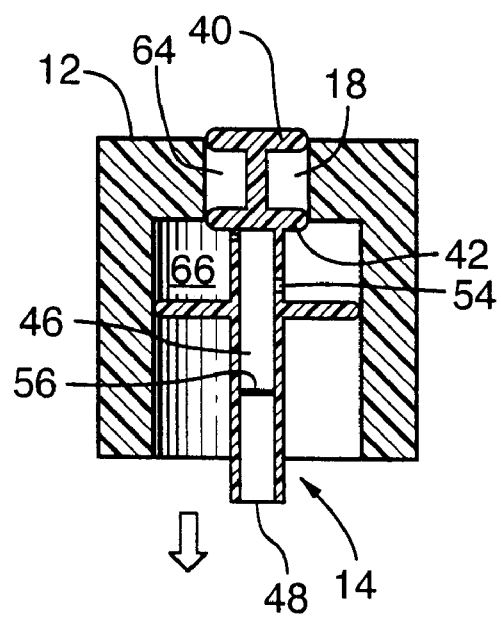
FIG. 7 is a cross-sectional side view substantially identical to FIG. 5 with the piston in an intermediate position, however, in a extension stroke.

From the intermediate position shown in FIG. 7, on movement of the piston 14 outwardly towards the fully extended position of FIG. 8, the inner sealing disk 40 seals the inner chamber 18 against flow therethrough and the intermediate sealing disk 42 moves inwardly beyond the inner chamber 18 so as to provide communication between the inner compartment 64 and the outer compartment 66. Once communication is established between the inner compartment 64 and the outer compartment 66, liquid in the inner compartment 64 flows under gravity down into the outer compartment 66 and air in the outer compartment 66 flows upwardly into the inner compartment 64. With the further downward movement of the piston 14 to the fully extended position of FIG. 8, air continues to be drawn into the combined inner compartment 64 and outer compartment 66 via the outlet 48, passageway 46 and inlets 53 and 54 such that on reaching the fully extended position, as seen in FIG. 8, liquid in the outer compartment 66 will form a layer upon the outer sealing disk 44. FIG. 8 is identical to FIG. 4 and the pump cycle may be repeated.

It is to be appreciated that the relative volume of the inner compartment 64 and outer compartment 66 may be chosen so as to have a desired proportion of liquid and air in the combined inner compartment 64 and outer compartment 66 in the fully extended position and, preferably, with volume of liquid such that a level of liquid in the compartment 66 below the inlet 53 but above the inlet 54.

The fact that in the first embodiment air is drawn upwardly through the outlet 48 can be of assistance in reducing dripping of foam and liquid and, as well, can be of assistance in ensuring a mixture of liquid and foam in the passageway 46 above the screen 56 in a subsequent retraction stroke when liquid and air are to be dispensed.

The relative amounts of air and liquid in the compartments 64 and 66 in the fully extended position as well as the manner and nature of the inlets 53 and 54 can be significant as, for example, to determine the extent to which air may be compressed in the outer chamber 20 which can have an effect on the velocity of air flowing through the screen 56 and, hence, the extent to which foaming may be accomplished.

The preferred embodiment illustrated in FIGS. 2 to 8 shows the inner sealing disk 40 and intermediate sealing disk 42 in the intermediate position both sealing the inner chamber 18. It is to be appreciated that under one preferred arrangement, preferably, at least one of the inner sealing disk 40 and intermediate sealing disk 42 seals the inner chamber 18 at all times. It is to be appreciated, however, that it is possible to have the inner sealing disk 40 and intermediate sealing disk 42 spaced axially a distance such that there is a time during movement between the fully extended position and the fully retracted position in which neither of the inner sealing disk 40 and intermediate sealing disk 42 seal the inner chamber 18 and this can be advantageous, for example, to permit increased quantities of air to move upwardly into the reservoir while additional quantities of liquid move downwardly out of the reservoir.

Having the condition arise that neither the inner sealing disk 40 nor the intermediate sealing disk 42 seal the inner chamber 18 for at least a small portion of the stroke can be advantageous to permit equalization of the pressures in the reservoir and in the outer compartment 66 as may be useful, for example, to assist in ensuring that a vacuum does not arise in the interior of the reservoir and/or to reduce the likelihood of preventing an unduly large positive pressure from being developed within the reservoir.

The pump could alternatively be structured so as to provide with each stroke a small amount of air under pressure into the interior of the reservoir, which positive pressure, provided it is not dangerous to the integrity of the container, can assist in urging liquid to exit the reservoir into the inner chamber 18 when the inner sealing disc 40 is not sealing entry into the inner chamber 18.

The length of the stroke of the piston as, for example, from the intermediate position to the fully extended position can be varied so as to control the amount of air which is drawn into the outer chamber 20. The length of the stroke by which the piston 14 is moved from the intermediate position to the fully retracted position can be varied to control the extent to which liquid and air may be expelled in any stroke.

Reference is now made to FIGS. 9 to 14 which illustrate a second embodiment of a pump assembly in accordance with the present invention. Throughout the drawings, the same reference numerals are used to refer to like elements.

Figure 9:
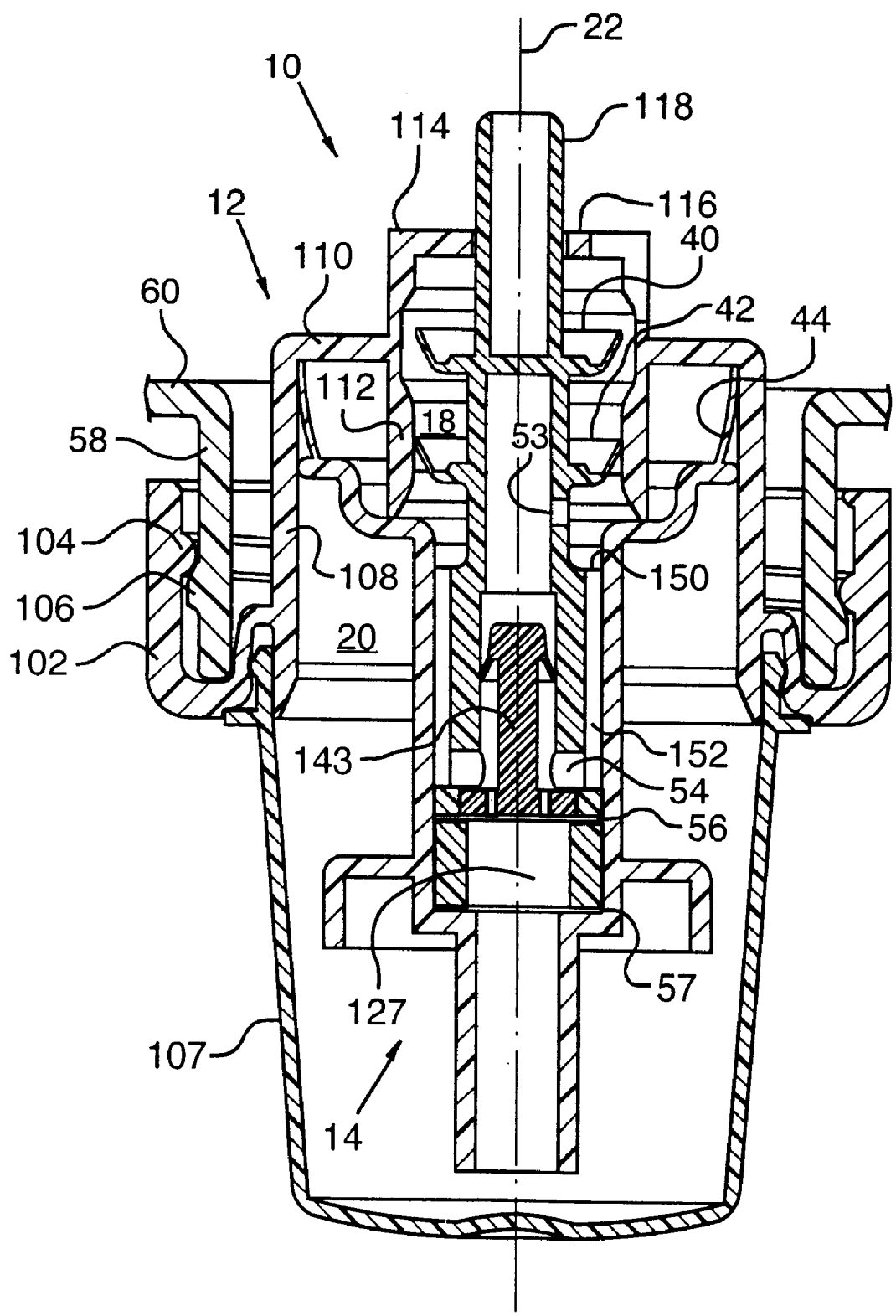
FIG. 9 is a cross-sectional side view of a pump assembly in accordance with a second embodiment of the present invention.

FIG. 9 also shows a pump assembly 10 having a piston chamber-forming body 12 and a piston 14. The piston chamber-forming body 12 is threadably secured to the neck 58 of a rigid sealed bottle 60. Body 12 is provided with an axially extending generally cylindrical rim 102 provided outwardly from the outer chamber 20 and carrying inwardly directed threads 104 adapted to engage complementary threads 106 carried on the neck 58 of the bottle 60.

Figures 10, 11:
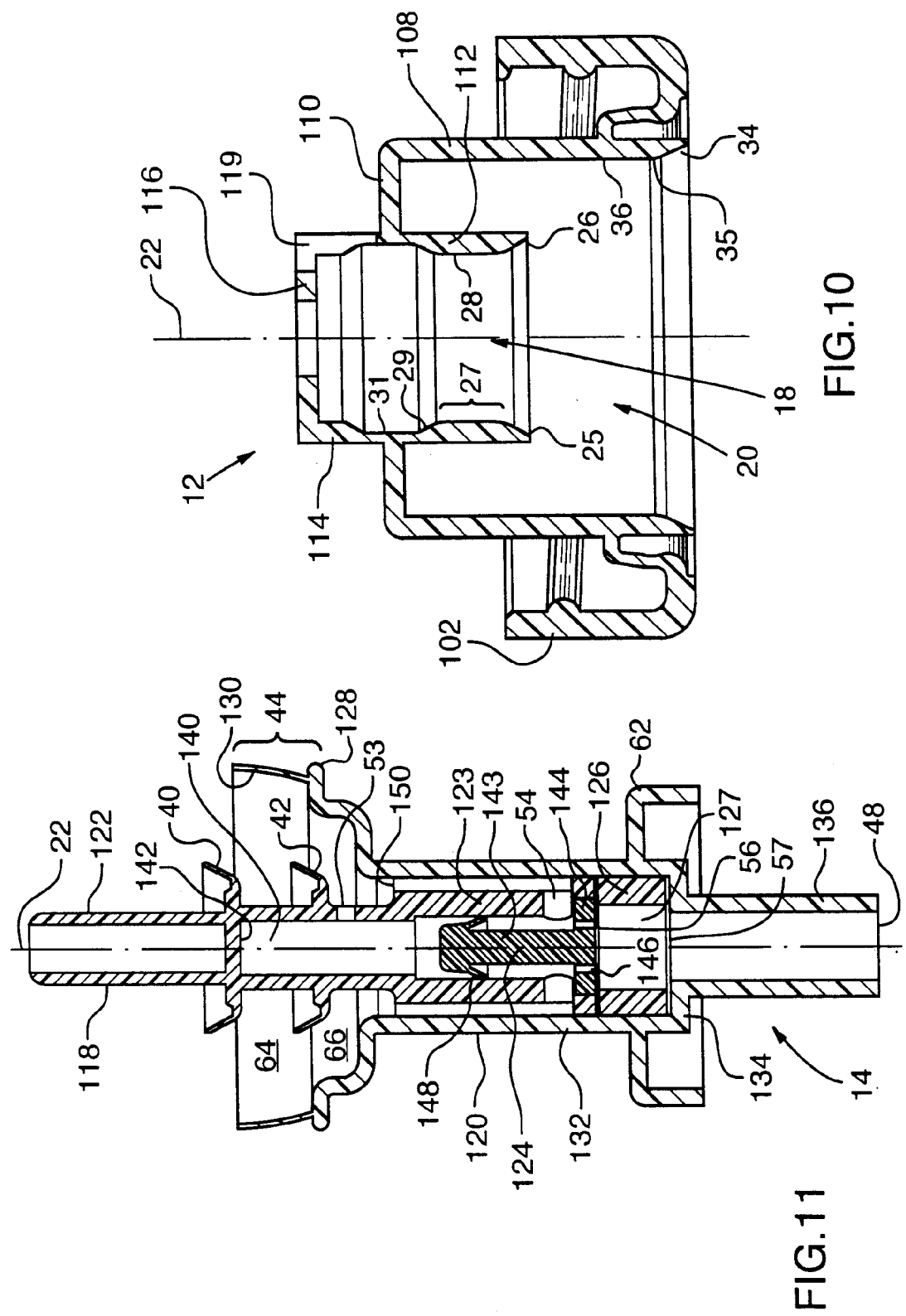
FIGS. 10 and 11 are cross-sectional side views of the body and piston, respectively, of the pump assembly of FIG. 9.

FIG. 9 also shows a removable cover 107 which fits in a snap-fit engagement onto body 12 forming an airtight annular seal thereabout to protect the pump assembly 10 from contamination prior to use as, for example, during shipment. As best seen in FIG. 10, the body 12 is formed with a cylindrical outer tubular portion 108 connected at an inner end via a radially extending flange portion 110 to a cylindrical inner tubular portion 112. The inner tubular portion 112 extends axially radially inside the outer tubular portion 108.

The outer chamber 20 is formed radially inwardly of the outer tubular portion 108 having a side wall 36 thereabout and open at its outlet opening 34. As shown, the side wall 36 tapers outwardly at chamfers 35 proximate the outlet opening 34 to facilitate entry of the piston 14.

Figure 14:
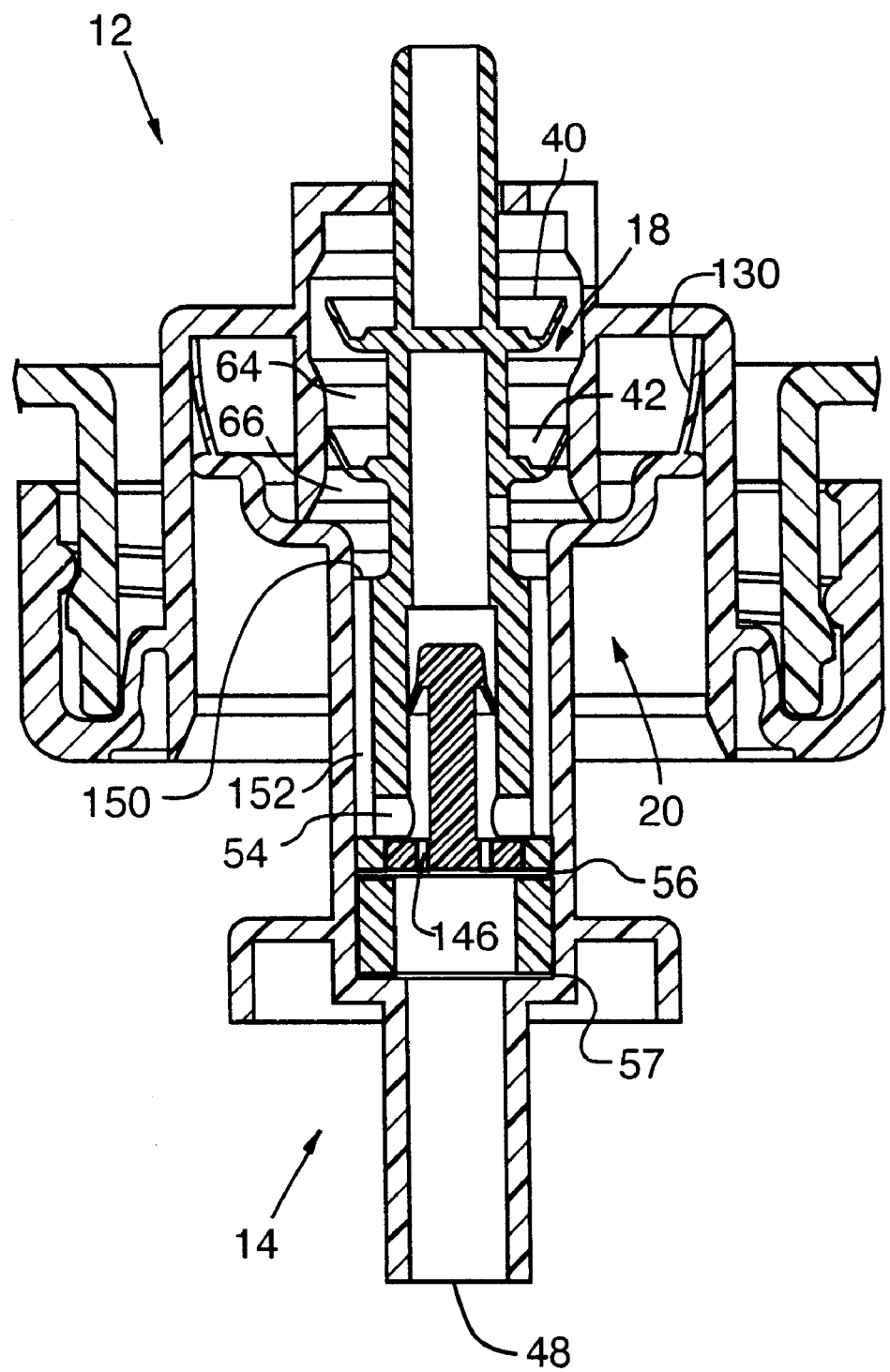
FIG. 14 is a cross-sectional side view of the pump assembly of FIG. 8 in a fully retracted position.

An inner chamber 18 is formed radially inwardly of the inner tubular portion 112. The inner tubular portion 112 defines an outlet opening 26 of the inner chamber 18 and a side wall 28 thereof. The inner chamber 18 has its side wall 28 taper outwardly as a chamfer 25 proximate the outlet opening 26 to facilitate entry of the piston into the inner chamber 18. The side wall 28 has a portion 27 of constant diameter between chamfer 25 and an axially inwardly spaced chamfer 29. The side wall 28 of the inner chamber 18 has a portion 31 of increased diameter relative to the constant diameter portion 27 spaced axially inwardly from the constant diameter portion 27 by chamfer 29. The increased diameter portion 31 permits fluid flow inwardly and outwardly in the inner chamber 18 past the inner disk 40 of the piston 14 when the piston 14 is in the fully withdrawn position as seen in FIGS. 9 and 14.

The inner tubular portion 112, outer tubular portion 108, inner chamber 18 and outer chamber 20 are each coaxial about axis 22.

The inner tubular portion 112 extends axially inwardly from flange portion 110 as a series of circumferentially spaced arms 114, only one of which is shown cross-sectioned on the left-hand side of FIGS. 9, 10 and 12 to 14 to support an annular ring 116 disposed coaxially about the central axis 22. The ring 116 serves as a guide to assist in guiding a cylindrical inward guiding portion 118 of a stem 38 of the piston 14 in coaxial sliding within the body 12. Spaces 119 are provided between the arms 114 as shown on the right-hand side of FIGS. 9, 10 and 12 to 14 to provide free communication for fluid between the reservoir and the interior of the inner tubular portion 112, radially through the tubular portion 112.

As best seen in FIG. 11, the piston 14 is formed from six elements, namely, an outer casing 120, an inner core 122, a center plug 124, a spacer ring 126 and two screens 56 and 57.

The outer casing 120 is of enlarged diameter at its axially inner end where the outer disk 44 is provided. The outer disk 44 is shown as including a locating flange 128 to locatably engage the cylindrical side wall 36 of the outer chamber 20 and a resilient flexible circular sealing disk 130 which sealably engages the side wall 36 and prevents flow of fluids axially outwardly therepast.

The outer casing 120 is shown with the outer disk 44 carried as a radially outwardly extending flange on a cylindrical large tube portion 132 which extends axially outwardly to a radially inwardly extending shoulder 134 supporting a small tube portion 136 extending axially outwardly from the shoulder 134 to the outlet 48. Outer screen 57 is located on the shoulder 134. Outer screen 57 is held on the shoulder 134 by the annular spacer ring 126 spaced outward of an inner screen 56. The inner core 122 sandwiches the outer screen 57 onto the ring 126. The inner core 122 also carries the plug 124 coaxially extending inwardly into the inner core 122 inwardly of the outer screen 57.

The inner core 122 carries the inner disk 40 and the intermediate disk 42. Each of the inner disk 40 and intermediate disk 42 comprise circular resilient flexible disks each of which extends radially outwardly and away from the outlet 48. Each of the inner flexible disk 40 and intermediate flexible disk 42, when engaged with the constant diameter portion 27 of the inner chamber 18, prevent fluid flow axially outwardly therepast through the inner chamber 18, however, are adapted to have their resilient outer edges deflect radially inwardly to permit fluid flow, under pressure differentials above a predetermined pressure, axially inwardly past the disks.

Figure 12:
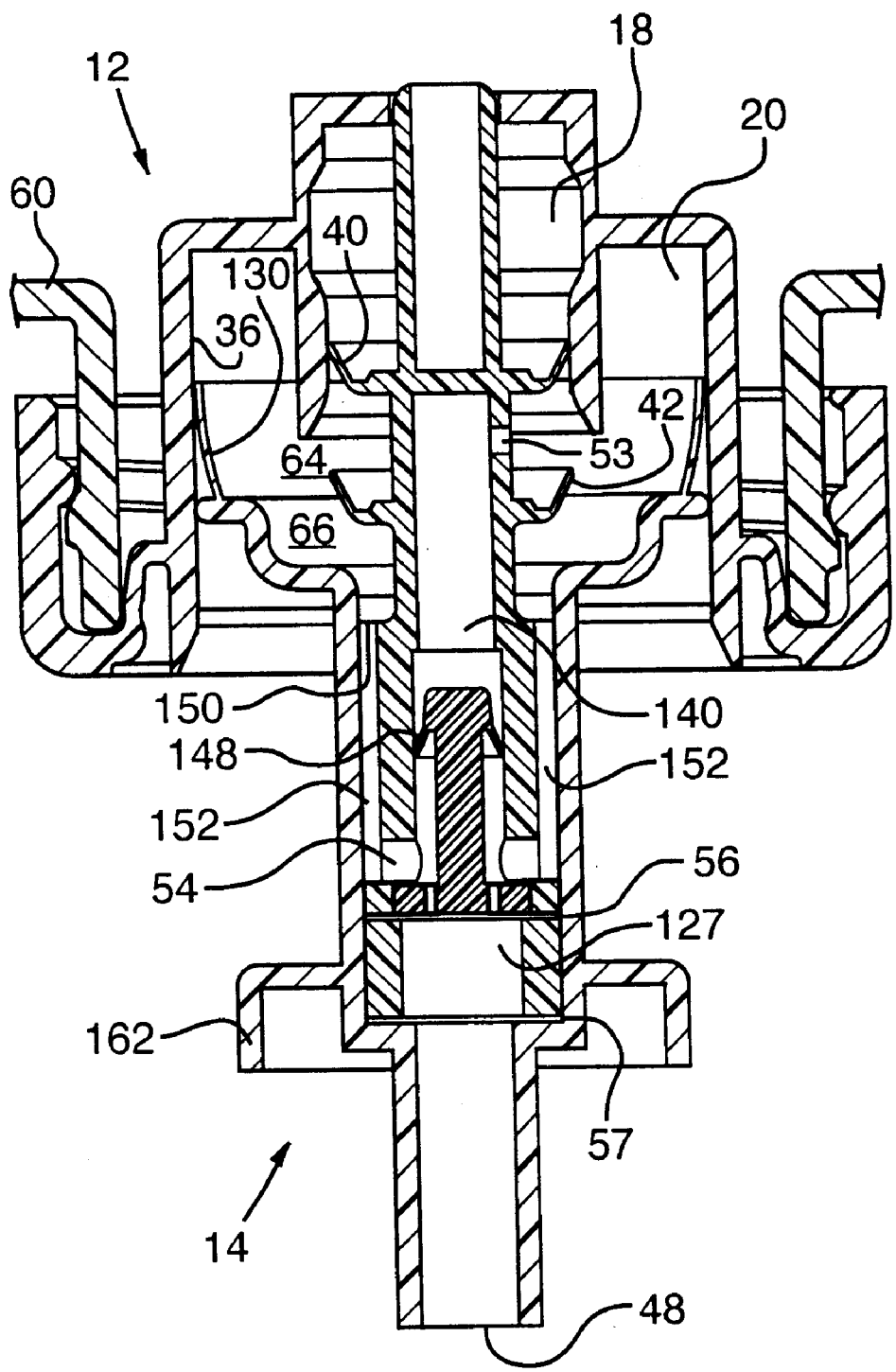
FIG. 12 is a cross-sectional side view of the pump of FIG. 8 in a fully extended position.

As seen in FIGS. 9 and 12, when the inner disk 40 is located in the inner chamber 18 inwardly from the constant diameter portion 27 in the increased diameter portion 31, then the inner disk 40 does not prevent flow of fluid between the inner chamber 18 and the reservoir 60.

The inner core 122 has a hollow bore 140 closed at an axial inner end at 142 and open at an axial outer end. The plug 124 is coaxially received within the bore 140 at the axial outer end. The plug 124 has an elongate body 143 which extends inwardly into the bore 140. The plug 124 has a radially extending base 144 at its outer end with a plurality of circumferentially spaced opening 146 therethrough. The body 143 of the plug 124 carries an integral central sealing disk 148 which extends radially outwardly from the body 143 to engage the side wall of the bore 140. The central sealing disk 148 has a deformable edge portion which engages the side wall of the bore 140 to prevent fluid flow axially inwardly therepast in the bore, however, permits fluid flow outwardly therepast under pressures above a predetermined pressure necessary to deflect the central sealing disk 148 out from engagement with the side wall of the bore.

The inner core 122 includes a cylindrical lower portion 123 which has a plurality of flutes at circumferentially spaced locations thereabout which effectively form with the outer casing 120 peripheral passageways 152 which extend axially. Passageways 152 are open to the outer compartment 66 between disks 42 and 44 at openings 150 at the inner ends of the passageways. At the outer ends, the passageways 152 join radial inlets 54 in the lower portion 123 which provide communication into the central bore 140.

Radially extending inlet 53 extends into the bore 140 from the outer compartment 66 between the intermediate disk 42 and the outer disk 44.

The piston 14 provides a common flow path which is provided for flow of fluids in the bore 140 immediately inwardly above the base 144 of the plug 124, through the openings 146 in the base 144 of the plug 124, through the inner screen 57, through a hollow central opening 127 in the spacer ring 126, through the outer screen 56 and, hence, through the smaller tube portion 136 to the outlet 48. However, the piston 14 provides two different pathways for flow of fluid from the outer compartment 66 to the openings 146 in the base 144 of the plug 124.

A first pathway permits flow via openings 152, peripheral passageways 150 and inlets 54 into the bore 140. This first pathway permits fluid flow both inwardly and outwardly and is particularly adapted to receive any liquid which under gravity flows down to the lower and axially outermost portion of the outer compartment 66 where the openings 150 to the peripheral passageways 150 are provided.

A second pathway provides flow via the inlet 53 into the bore 140 and past the central sealing disk 148 to the openings 146 in the base 144 of the plug 124. It is to be appreciated that this second pathway is only open to fluid flow outwardly from the outer compartment 66 since the central sealing disk 148 prevents fluid flow inwardly therepast. Preferably, as shown, the inlets 53 are disposed at an axial inner location in the outer compartment 66 so as to be more likely to have the inlet 53 receive air which will rise to the upper and axial inner end of the upper compartment 64 underneath the intermediate disk 42 and be found above a level of liquid in the lower outer compartment 66.

Operation of the second embodiment of FIGS. 9 to 14 is similar to that with the first embodiment of FIGS. 1 to 8.

Figure 13:
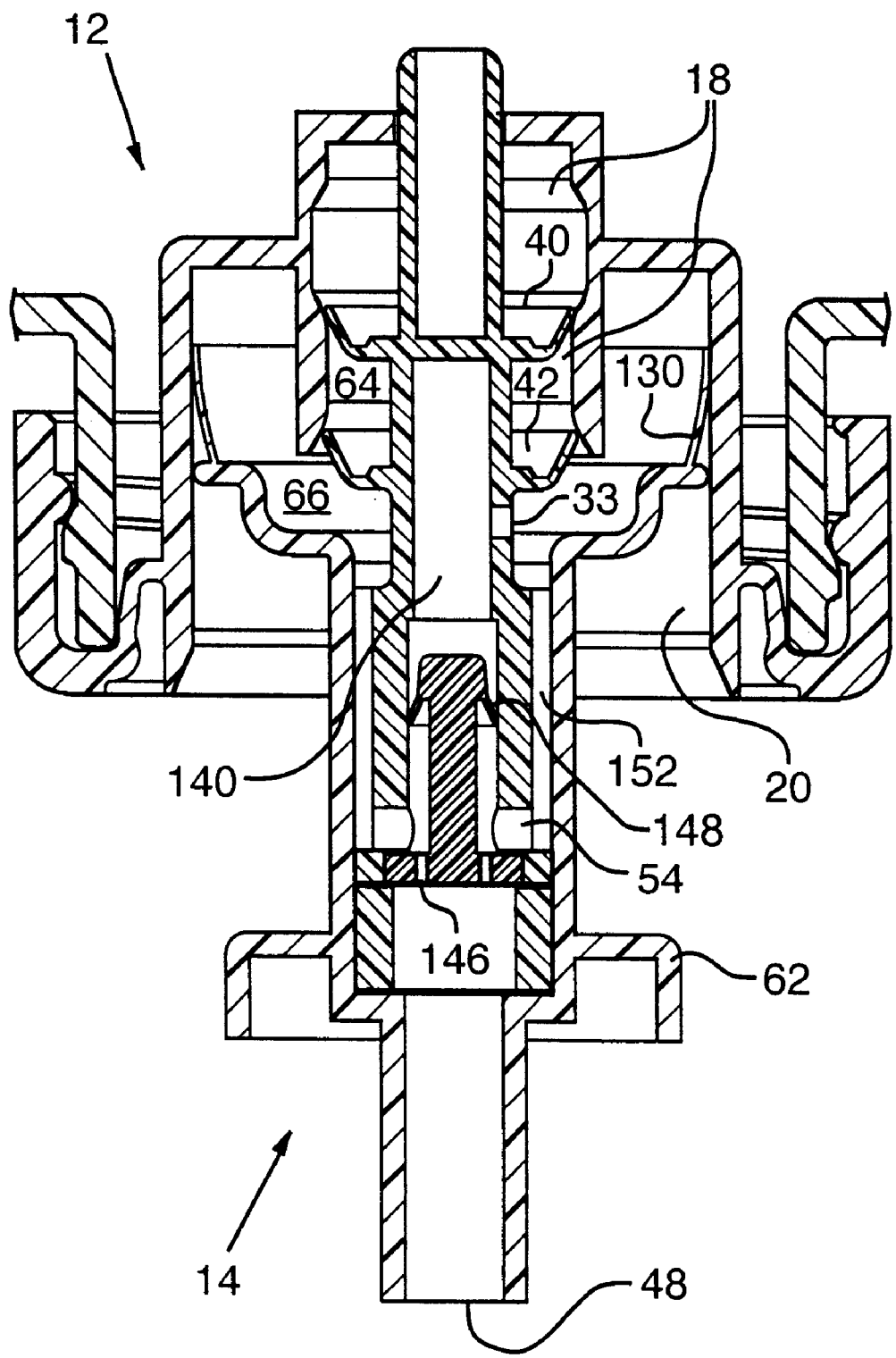
FIG. 13 is a cross-sectional side view of the pump assembly of FIG. 8 in an intermediate position.

In a fully extended position as seen in FIG. 12, the inner sealing disk 40 seals the inner chamber 18 against fluid flow outwardly therefrom. In an intermediate position as shown in FIG. 13, both the inner disk 40 and the intermediate disk 42 seal the inner chamber 18 against fluid flow outwardly therethrough. In the fully retracted position as shown in FIG. 14, the intermediate disk 42 seals the inner chamber 18 from fluid flow outwardly from the reservoir.

In the fully extended position as seen in FIG. 12, the intermediate disk 42 is withdrawn inwardly past the inner tubular portion 112 to a position in which it does prevent flow of fluid between the inner compartment 64 and the outer compartment 66 and the two compartments are in communication.

In the fully retracted position as shown in FIG. 14, the inner disk 40 does not prevent flow of fluid therepast and, hence, the reservoir 60 is in communication with the inner compartment 64.

In a retraction stroke, on moving from the position of FIG. 12 to the position of FIG. 13, air and/or liquid is compressed and thereby forced to pass outwardly from the outer compartment 66 via either the first pathway through peripheral passageways 152 and inlet 54 or via the second pathway through the inlet 53 and past the central sealing disk 148 in bore 140. The central sealing disk 148 provides resistance to fluid flow axially outwardly therepast. This is advantageous in a situation where liquid fills the lowermost portion of the outer compartment 66 such that liquid is being urged via the first pathway through the peripheral passageways 152 and inlet 54 and air fills the upper portion of the outer chamber 66 such that air is being forced via the second pathway through the inlet 53 and bore 140 onto the central sealing disk 148. The central sealing disk 148 is preferably chosen so as to require a predetermined air pressure differential before air may be permitted to flow outwardly therepast.

The resistance of liquid flowing from the peripheral passageways 152, inlet 54, openings 146 in the plug 124 and through the screens 56 and 57 requires a pressure on the liquid sufficiently to force the liquid therethrough. The central sealing disk 148 is preferably selected so that air pressurized to a pressure at least equal to that required to overcome the resistance to liquid flow will be required for air flow past the central sealing disk 148. Providing the air to be pressurized to pass by the central sealing disk 148 is of assistance in providing for turbulent air flow through the screens 56 and 57 which, when liquid has also been passed through the screens, provides for preferred foaming as liquid and air are passed effectively simultaneously through the screens.

In an extension stroke on moving from the position of FIG. 13 to the position of FIG. 14, air is drawn into the outer compartment 66. One pathway for the air to be drawn in is via the outlet 48, through the screens 56 and 57 and, hence, via the inlet 54 and peripheral passageways 152 into the outer compartment 66. Air cannot be drawn inwardly through the bore 140 and inlet 53 since the bore 120 is blocked against flow inwardly therepast by the central sealing disk 148.

As shown in FIG. 12, the outer disk 44 includes a resilient sealing disk 130 which is formed as a thin resilient disk having an elastically deformable edge portion near the side wall 36 of the outer chamber 20. This edge portion of the sealing disk 130 is deflectable radially inwardly so as to permit, under a sufficiently high vacuum differential, air to flow axially inwardly therepast. Preferably, the piston 14 may be configured such that substantially all air to be drawn inwardly is drawn inwardly via the peripheral passageways 146 and the first pathway, however, a device could be arranged such that the restriction to flow through the first pathway, and/or the screens 57 and 56 is such that some proportion or substantially all the air is drawn past the sealing disk 130. The locating flange 128 on the outer disk 44 is preferably provided to permit fluid flow therepast but could be configured to prevent fluid flow inwardly and/or outwardly.

In a withdrawal stroke, to the extent that a vacuum may come to be developed in the inner compartment 64 and/or in the reservoir 60, this vacuum can be relieved by reason of fluid flow inwardly past each of the inner disk 40 and intermediate disk 42. It is to be appreciated, however, that the development of a continuous vacuum within the reservoir 60 in preferred operation of the pump assembly 10 should be avoided, however, a temporary vacuum can assist in drawing air upwardly from the inner compartment 64.

Reference is made to FIG. 15 which shows a piston 14 for a pump assembly in accordance with a third embodiment of the present invention. The piston 14 of FIG. 15 is identical to the piston 14 of FIG. 11 with the exception that the inlet 53 of FIG. 11 has been eliminated and the center plug 124 of FIG. 11 has been replaced with a modified center plug 156.

Center plug 156 of FIG. 15 comprises a hollow tubular member 158 with a widened base 144. The tubular member 158 has a bore 160 extending centrally therethrough from an open inner opening 162 to an open outer opening 164.

The tubular member 158 is disposed coaxially in bore 140 so as to provide an annular passageway 166 annularly about the tubular member 158.

The embodiment of FIG. 15 provides a single pathway for fluid flow between the outer compartment 66 and the outlet 48 via passageways 152, inlet 54, annular passageway 166, bore 160, screen 56, opening 127, screen 57 and bore 140. This pathway can be selected to have a relative length and relative cross-section which resists flow of fluid inwardly and outwardly therethrough and, particularly, can assist in preventing liquid from dripping out the outlet 48 as when the pump assembly is left inactive as, for example, in positions similar to that of FIG. 13 or 14.

The relative vertical height of the inner opening 162 to the tubular member 158 relative the outer compartment 66 can determine the level of liquid which will be maintained in the outer compartment 66 if the liquid is free to drip under gravity out of the outlet 48.

The relative volume of fluid which would be required to fill the compartment 66, passageway 152, inlets 54 and passageway 166 to a height of the inner opening 162 may advantageously be selected towards assisting in gauging the volume of fluid to be held in the outer compartment 66. The embodiment of FIG. 15 can be used without screens 56 and 57 when foaming is not desired.

Reference is made to FIG. 16 which shows a fourth embodiment of a piston 14 in accordance with the present invention and which is identical to the piston in FIG. 15 with the exception that the two screens 56 and 57 and the ring 126 have been eliminated, the center plug 156 is of increased length and the bore 140 has been extended further inwardly. FIG. 16 illustrates a piston 14 for use to dispense liquid without foaming. The inner opening 162 of the tubular member 158 is inward of the inner disk 40 to assist in preventing liquid in the outer compartment 66 from flowing due to gravity out the outlet 48. It is to be appreciated that the relative location of the inner opening 162 can be selected to be at any relative height from that of inlet 54 to a height inward of the inner disk 40.

To assist, or provide at least some foaming, an inlet similar to inlet 53 in FIG. 9 could be provided from the outer compartment 66 to the annular passageway 166, preferably outwardly of, that is, below the inner opening 162. By providing such inlet 53 to be small in size so as to restrict air flow therethrough until air in outer compartment 66 may be sufficiently pressurized, then pressurized air will be injected under pressure into liquid passing through the annular passageway 166. Other embodiments are possible in which a one-way valve mechanism prevents flow back from the annular passageway 166 through such an inlet 53 as is, for example, accomplished with the central sealing disk 148 of the embodiment of FIG. 9.

Figure 17:
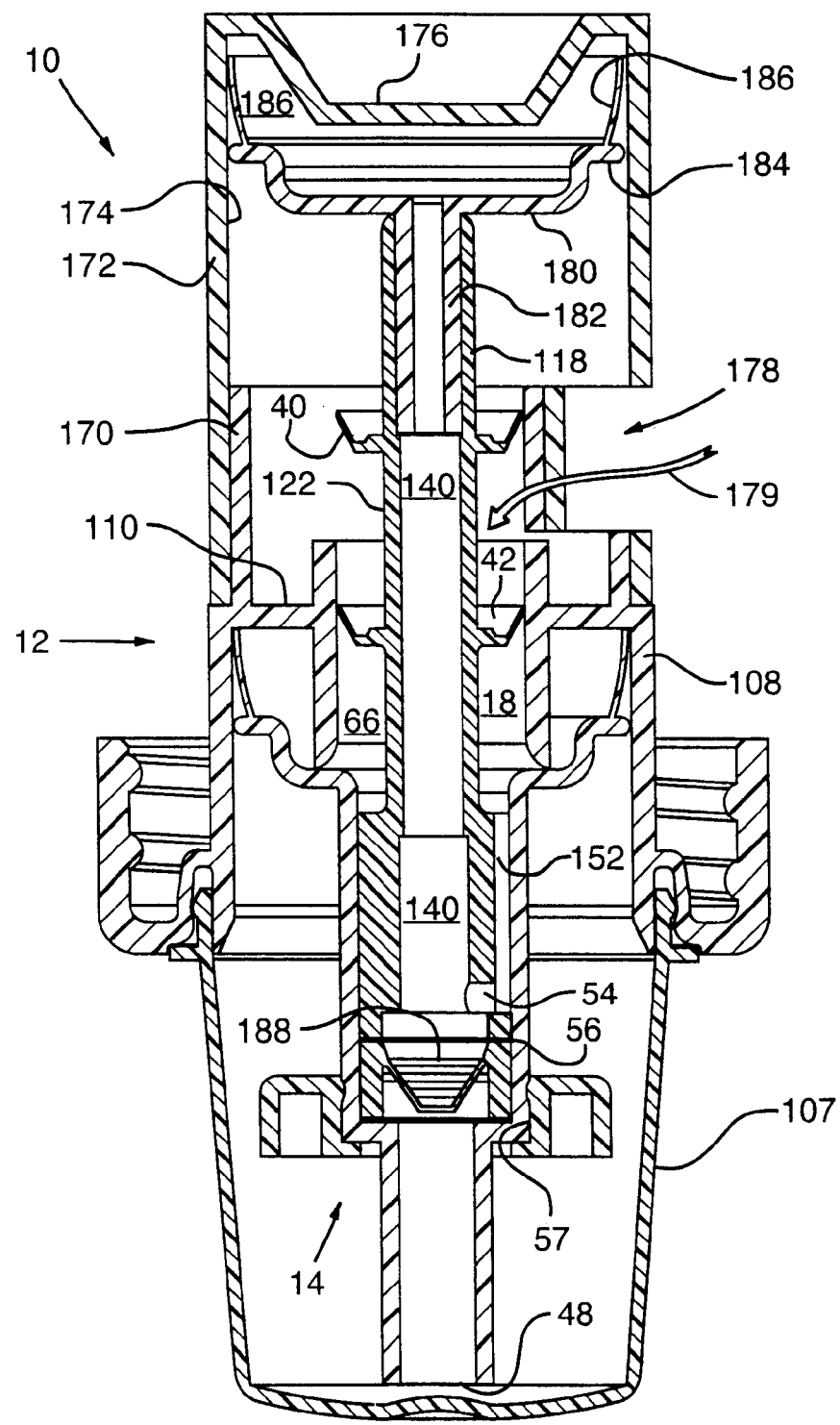
FIG. 17 is a cross-sectional side view of a pump assembly in accordance with a fourth embodiment of the present invention.

Reference is made to FIG. 17 which illustrates a fifth embodiment of a pump assembly 10 in accordance with the present invention in a fully retracted position.

The body 12 in FIG. 17 is similar to that in FIGS. 9 to 14 but carries on its flange portion 110 an inward axially extending generally cylindrical support tube 170 adapted to support an air chamber-forming member 172. Member 172 has a cylindrical side wall 174 and is closed at its inner end by end wall 176. Openings such as 178 are provided aligned through both the wall 174 and the support tube 170 to provide communication from the interior of the reservoir into the interior of the support tube and hence into the inner chamber 18 as indicated by arrow 179.

The piston 14 in FIG. 17 is similar to that of FIGS. 9 to 14 but carries at its inner end an air pump disk 180 fixedly supported by a hollow neck tube 182 being fixedly secured within a hollow support tube 118 of the inner core 122. The neck tube 182 is open at both ends.

The air pump disk 180 includes a locating flange 184 to locatably engage the cylindrical side wall 174 and a resilient flexible circular sealing disc 186 which sealably engages the side wall 174 and prevents flow of fluids axially outwardly therepast. An air chamber 186 is defined between the air chamber-forming member 172 and the air pump disk 180 which will increase and decrease in volume as the piston 14 is moved axially in the body 12 between the extended and retracted positions. The air chamber 186 is in communication with the bore 140 via the neck tube 182.

In reciprocal sliding of the piston 14 from the retracted position shown in FIG. 17 towards an extended position, fluid, notably air from the outlet 48 but also possibly liquid and/or foam in the bore 140, is drawn upwardly into the air chamber 186 at the same time as liquid, foam and/or air is drawn into the lower compartment 66. In sliding of the piston 14 from the extended position to the retracted position, air and/or other foam or fluid in the air chamber 186 is pressurized and forced outwardly through the bore 140 through the screen 56. The air pump disk 180 provides for inhalation and expulsion of fluids, notably air, in addition to the quantities of fluid inhaled and expulsed by the remainder of the pump assembly and, thus, the air pump disk 180 increases the volume of air which is available to be forced through the screens 56 and 57 to produce foam. The configuration shown has the air pump comprising the air chamber-forming member 172 and the air pump disk 180 inward from the remainder of the pump assembly 10 and of a diameter not exceeding that of the outer tubular portion 108. This is an advantageous configuration to provide additional air pumping capacity with the same piston stroke in a device which can be inserted into the mouth of a reservoir.

FIG. 17 shows in addition to the two screens 56 and 57 to produce foam, a three dimensional basket-like screen 188 having generally frustoconical walls with small openings therethrough as in the manner of known filter members.

In FIG. 17, only one passageway 152 and inlet 54 is shown to provide communication from the outer compartment 66 to the bore 140.

It is to be appreciated that the nature of the liquid to be dispensed including its viscosity and flow characteristics will be important in order for a person skilled in the art to make suitable selection of the relative sizes and dimensions and resistance to flow provided by the various passageways, inlets, outlets and screens and/or past the various disks including the central sealing disk 148. As well, the quantity of liquid desired to be dispensed in each stroke will have a bearing on the relative proportion and sizing of the components including particularly the inner compartment 64, outer compartment 66 and the axial length of a stroke of the piston.

In the preferred embodiments, the engagement disk 62 is provided on the piston 14 for engagement to move the piston inwardly and outwardly. It is to be appreciated that various other mechanisms can be provided for engagement and movement of the piston relative the body 12.

The preferred embodiments show dispensers for passing liquid and air through screens 56 and 57 to dispense the liquid as a foam. The screens 56 and 57 can be eliminated in which case the dispensers illustrated could serve to dispense liquid without foaming yet to deliver quantities of air to the reservoir and, in the context of a reservoir which is a sealed rigid container, prevent the build up of a vacuum in the container.

The preferred embodiments of the invention show passages for dispensing of the air and/or liquid as being provided internally within a piston. Such an arrangement is believed preferred from the point of view of ease of construction of the pump assembly 10. However, it is to be appreciated that passageways for dispensing the liquid and/or foam may be provided, at least partially, as part of the body 12 or removably mounted to the body 12.

In accordance with the preferred embodiment illustrated, the relative buoyancy of air within the liquid and, hence, the separation of air and liquid due to gravity are utilized as, for example, to permit air in the compartment 64 to flow upwardly into the reservoir 60 and liquid in the reservoir 60 to flow downwardly into the inner compartment 64 as, for example, when the inner compartment 64 is open to the reservoir. It is to be appreciated, therefore, that the pump assembly in accordance with the presence invention should typically be disposed with what has been referred to as the inner end of the pump assembly at a height above the height of the outer outlet end.

While this invention has been described with reference to preferred embodiments, the invention is not so limited. Many modifications and variations will now occur to persons skilled in the art. For a definition of the invention, reference is made to the appended claims.

We claim:

1. A pump for dispensing liquid from a reservoir comprising:

a piston chamber-forming member having an inner cylindrical chamber and an outer cylindrical chamber each having a diameter, a chamber wall, an inner end and an outer end;

the diameter of the inner chamber being less than the diameter of the outer chamber, the inner chamber and outer chamber being coaxial with the outer end of the inner chamber opening into the outer chamber;

an inner end of the inner chamber in fluid communication with the reservoir;

a piston-forming element received in the piston chamber-forming member axially slidable inwardly and outwardly therein between an outward extended position and an inward retracted position;

the piston-forming element having an axially extending hollow stem having a central passageway closed at an inner end and having an outlet proximate an outer end;

an inner disk on the stem extending radially outwardly from the stem adapted to engage to the chamber wall of the inner chamber;

an intermediate disk on the stem extending radially outwardly from the stem adapted to engage the chamber wall of the inner chamber, the intermediate disk spaced axially outwardly from the inner disk relative the inner end of the stem;

an outer disk on the stem spaced axially outwardly from the intermediate disk and extending radially outwardly from the stem into engagement with the chamber wall of the outer chamber to prevent fluid flow outwardly therebetween;

a first inlet located on the stem between the outer disk and the intermediate disk in communication with the passageway;

in the retracted position, the intermediate disk is received in the inner chamber to prevent fluid flow from the outer end of the inner chamber outwardly therepast and the inner disk does not prevent fluid flow between the reservoir and the inner chamber therepast via the inner end of the inner chamber;

in the extended position, the inner disk is received in the inner chamber to prevent fluid flow from the inner end of the inner chamber inwardly therepast and the intermediate disk does not prevent fluid flow between the inner chamber and the outer chamber via the outer end of the inner chamber.

2. A pump as claimed in claim 1 wherein:

on axial movement of the piston-forming element from the retracted position to the extended position:
  (a) the intermediate disk moving from a blocking position in which it closes the outer end of the inner chamber from fluid flow therepast to an open position in which it does not close the outer end of the inner chamber to free fluid flow therepast inwardly or outwardly, and
  (b) the inner disk moving from an open position in which it does not close the inner end of the inner chamber to free fluid flow therethrough inwardly or outwardly to a blocking position in which it closes the inner end of the inner chamber from fluid flow therepast.

3. A pump as claimed in claim 2 wherein when the inner disk is in its blocking position, the outer disk is in the open position and when the inner disk is in its open position, the outer disk is in its blocking position.

4. A pump as claimed in claim 2 wherein on axial movement of the piston-forming element from the retracted position to the extended position air is drawn into the outer chamber from the outlet.

5. A pump as claimed in claim 1 including a porous member in the passageway between the first inlet and the outlet for generating turbulence in fluid passing therethrough to generate foam when air and liquid pass therethrough simultaneously.

6. A pump as claimed in claim 4 including a porous member in the passageway between the first inlet and the outlet for generating turbulence in fluid passing therethrough to generate foam when air and liquid pass therethrough simultaneously.

7. A pump as claimed in claim 1 in which each of the piston chamber-forming member and piston-forming element is of generally circular cross-section disposed coaxially about a central axis along which the piston-forming element and piston chamber-forming member are slidable relative each other.

8. A pump as claimed in claim 1 in which the inner chamber is disposed above the outer chamber with the inner end of the inner chamber above the outer end of the inner chamber and the inner end of the outer chamber above the outer end of the outer chamber.

9. A pump as claimed in claim 8 including a second inlet located on the stem between the outer disk and the intermediate disk in communication with the passageway,
  the second inlet spaced on the stem spaced axially from the first inlet inwardly toward the inner disk.

10. A pump assembly as claimed in claim 9 including a one-way valve providing for fluid flow through the second inlet to the passageway but preventing fluid flow from the passageway through the second inlet.

11. A pump as claimed in claim 10 wherein the one-way valve prevents fluid flow through the second inlet to the passageway under a pressure differential across the one-way valve less than a selected pressure differential.

12. A pump as claimed in claim 5 in which the inner chamber is disposed above the outer chamber with the inner end of the inner chamber above the outer end of the inner chamber and the inner end of the outer chamber above the outer end of the outer chamber.

13. A pump as claimed in claim 12 including a second inlet located on the stem between the outer disk and the intermediate disk in communication with the passageway,
  the second inlet spaced on the stem spaced axially from the first inlet inwardly toward the inner disk.

14. A pump assembly as claimed in claim 10 including a one-way valve disposed providing for fluid flow through the second inlet to the passageway but preventing fluid flow from the passageway through the second inlet.

15. A pump as claimed in claim 8 wherein an outer compartment is defined by the piston-forming element between the outer disk and the intermediate disk with an annular opening open radially outwardly therebetween, an inner compartment is defined by the piston-forming element between the intermediate disk and the inner disk with an annular opening open radially outwardly therebetween,
  wherein in the retracted position, the inner comparment is in communication with the reservoir via the annular opening of the inner compartment to permit air in the inner compartment to float upwardly under gravity into the reservoir from the inner compartment and be replaced by liquid in the reservoir flowing downwardly into the inner compartment.

16. A pump as claimed in claim 15 wherein in the extended position, the outer compartment and inner compartment are both in communication with the outer chamber via their annular openings to permit air in the outer compartment to float upwardly under gravity into the inner compartment and be replaced by liquid in the inner compartment flowing downwardly into the outer compartment.

17. A pump as claimed in claim 16 including a porous member in the passageway between the first inlet and the outlet for generating turbulence in fluid passing therethrough to generate foam when air and liquid pass therethrough simultaneously;
  including a second inlet located on the stem between the outer disk and the intermediate disk in communication with the passageway,
  the second inlet spaced on the stem spaced axially from the first inlet inwardly toward the inner disk;
  wherein in a retraction stroke while expelling fluid from the outer compartment, the outer compartment contains a volume of liquid with air above a level of the liquid and the level of the liquid in the outer compartment drops to become below the second inlet before the level of the liquid drops to a level of the first inlet.

* * * * *